(12) United States Patent
Lee

(10) Patent No.: US 11,643,053 B2
(45) Date of Patent: May 9, 2023

(54) MULTIPURPOSE WHEEL-WASHING APPARATUS

(71) Applicant: DAEKEUM GEOWELL CO., LTD., Incheon (KR)

(72) Inventor: Seung-Woo Lee, Incheon (KR)

(73) Assignee: DAEKEUM GEOWELL CO., LTD., Incheon (KR)

( * ) Notice: Subject to any disclaimer, the term of this patent is extended or adjusted under 35 U.S.C. 154(b) by 251 days.

(21) Appl. No.: 16/920,290

(22) Filed: Jul. 2, 2020

(65) Prior Publication Data

US 2021/0016749 A1 Jan. 21, 2021

(30) Foreign Application Priority Data

Jul. 19, 2019 (KR) .................. 10-2019-0087487

(51) Int. Cl.
*B60S 3/04* (2006.01)
*B08B 3/02* (2006.01)
*B60S 3/06* (2006.01)

(52) U.S. Cl.
CPC .............. *B60S 3/042* (2013.01); *B08B 3/022* (2013.01); *B60S 3/06* (2013.01)

(58) Field of Classification Search
CPC ............................. B08B 3/022; B01D 21/267
See application file for complete search history.

(56) References Cited

U.S. PATENT DOCUMENTS

| | | | | |
|---|---|---|---|---|
| 3,504,804 A | * | 4/1970 | Newman | B04C 5/103 |
| | | | | 210/512.1 |
| 5,498,329 A | * | 3/1996 | Lamminen | B60S 3/04 |
| | | | | 134/123 |
| 6,842,997 B1 | * | 1/2005 | Fratello | B60S 3/002 |
| | | | | 34/418 |
| 10,792,677 B2 | * | 10/2020 | Maduta | B04C 5/04 |
| 2009/0314216 A1 | * | 12/2009 | Polak | A01K 13/003 |
| | | | | 239/222.11 |

FOREIGN PATENT DOCUMENTS

| KR | 20140006184 | * | 12/2014 | ............... B60S 3/04 |
|---|---|---|---|---|
| WO | WO-2017039087 A1 | * | 3/2017 | ............... A61L 2/18 |

OTHER PUBLICATIONS

WO2017039087—Machine Translation (Year: 2017).*
KR20140006184—Machine Translation (Year: 2014).*

* cited by examiner

*Primary Examiner* — Marc Lorenzi
(74) *Attorney, Agent, or Firm* — LRK Patent Law Firm

(57) ABSTRACT

A multipurpose wheel-washing apparatus includes a wheel-washing unit including an upper frame provided with a plurality of rollers on which wheels of a vehicle are to be rotatably seated, and injection nozzles configured to inject high-pressure washing water onto the wheels seated on the rollers; and a lower frame provided with a water tank located below the upper frame so as to collect falling waste/turbid water; a water storage unit configured to store washing water to be supplied to the injection nozzles; a purification unit configured to receive and purify the waste/turbid water from the water tank and then send purified water to the water storage unit; and a blowing unit disposed on an exit side of the wheel-washing unit so as to blow air and provided with spray nozzles for selectively spraying water in a particulate form. Accordingly, environmental pollution can be significantly reduced.

5 Claims, 10 Drawing Sheets

(a)

(b)

(a)

(b)

(c)

(a)

(b)

(a)

(b)

(a)

(b)

(c)

MULTIPURPOSE WHEEL-WASHING APPARATUS

CROSS REFERENCE TO RELATED APPLICATION

This application claims priority to Korean Patent Application No. 10-2019-0087487, filed on Jul. 19, 2019, which is hereby incorporated by reference in its entirety into this application.

BACKGROUND OF THE INVENTION

1. Field of the Invention

The present invention relates to a multipurpose wheel-washing apparatus, and in particular, to a multipurpose wheel-washing apparatus which improves a conventional apparatus for washing wheels of a vehicle to reduce scattering dust, to increase productivity and movement convenience by means of a vertically separable configuration, and to enhance a function of purifying waste/turbid water generated upon washing of wheels, thereby significantly reducing environmental pollution.

2. Description of Related Art

In order to prevent environmental pollution caused by recent rapid industrial development and to meet various environmental pollution prevention laws, such as the Clean Air Conservation Act in Korea, a wheel-washing machine has been widely used in most industrial sites.

A wheel-washing machine is a machine for avoiding scattering dust that spreads into the atmosphere when a vehicle entering or leaving an industrial site is driven in a state where a contaminant such as mud is smeared on wheels or a lower portion of a vehicle body, and this wheel-washing machine is usually provided at an entrance of the industrial site so as to wash the lower portion of the vehicle body or the wheels of the vehicle entering or leaving the industrial site.

However, a conventional wheel-washing machine has several problems as follows.

First, since upon washing of wheels of a multi-axle vehicle, the number of wheel-washing per vehicle is increased or decreased depending on the number of rollers provided in the wheel-washing machine, a wheel-washing machine equipped with as many rollers as possible is preferred in practice. However, the wheel-washing machine equipped with a larger number of rollers is expanded in width, resulting in reduced productivity and movement convenience due to a limitation on the width of a loading deck of a truck upon transportation of the wheel-washing machine.

Second, because waste/turbid water resulting from completion of wheel washing contains a large amount of sludge, there is a limitation on performing purification of the waste/turbid water within a limited space in a short time and it is difficult to separate the sludge from waste/turbid water, whereby it was unsuitable for the waste/turbid water to be reused as wheel-washing water or to be discharged into a river as it is.

Third, water that contains suspended substances remains on wheels and a vehicle body of a vehicle that has been subjected to wheel washing, so that if the vehicle enters a general road in such a state, this water causes pollution of the road, which leads to insufficiency of measures to reduce fine dust among scattering dust generated at a construction site. Accordingly, there are rapidly increasing civil complaints from nearby residents.

SUMMARY OF THE INVENTION

The present invention is conceived to solve the aforementioned problems. An object of the present invention is to provide a multipurpose wheel-washing apparatus, wherein a blower fan used for spraying water is provided in the multipurpose wheel-washing apparatus to reduce scattering dust, a wheel-washing unit of the multipurpose wheel-washing apparatus has an improved vertically separable configuration so as to increase productivity, a lower frame of the wheel-washing unit is narrower than a width of a loading deck of a transportation vehicle so as to increase movement convenience of the wheel-washing unit, and a function of purifying waste/turbid water generated upon washing of wheels can be greatly enhanced to enable purified water to be reused as wheel-washing water and to be safely discharged into a river, thereby significantly reducing environmental pollution.

A multipurpose wheel-washing apparatus according to the present invention may be achieved by including a wheel-washing unit including an upper frame provided with a plurality of rollers on which wheels of a vehicle are to be rotatably seated, and injection nozzles configured to inject high-pressure washing water onto the wheels seated on the rollers; and a lower frame provided with a water tank located below the upper frame so as to collect falling waste/turbid water; a water storage unit configured to store washing water to be supplied to the injection nozzles; a purification unit configured to receive and purify the waste/turbid water from the water tank and then send purified water to the water storage unit; and a blowing unit disposed on an exit side of the wheel-washing unit so as to blow air and provided with spray nozzles for selectively spraying water in a particulate form.

The blowing unit preferably includes a blower fan having rotatable blades housed in the blower fan, the rotatable blades being driven by a motor, the blower fan being provided with the spray nozzles installed on a discharge port side of the blower fan; a support arm for vertically pivotably supporting the blower fan; a swing member configured to rotate the support arm so as to control a lateral swing angle of the blower fan; and a stretchable member having both ends connected to the blower fan and the support arm so as to control a vertical pivoting angle of the blower fan with respect to the support arm depending on extension and contraction of the stretchable member.

Preferably, assuming a fore-aft direction of the vehicle leaving the wheel-washing unit is referred to as an x-direction, an x-directional length of the lower frame is 2.2 m or less, an x-directional length of the upper frame is longer than the x-directional length of the lower frame, and the upper frame is further provided with an inclined plate having an x-directional length corresponding to a difference between the x-directional lengths of the upper frame and the lower frame.

Moreover, it is desired that the purification unit is a centrifugation-type purification unit and includes a water-supplying part formed with a stirring space configured to enable flow of the waste/turbid water therein; a stirring member provided in the stirring space so as to stir the waste/turbid water; and a precipitation separation part configured to receive and swirl the waste/turbid water stirred in the water-supplying part, thereby precipitating and separating foreign substances and discharging clean water to the outside.

Alternatively, the purification unit may be an inclined precipitation-type purification unit and may include a water-supplying part formed with a stirring space configured to enable flow of the waste/turbid water therein; a stirring member provided in the stirring space so as to stir the waste/turbid water; a baffling part configured to receive the waste/turbid water stirred in the water-supplying part and to cause the waste/turbid water to flow in a zigzag shape; and an inclined precipitation part configured to receive the waste/turbid water, which has passed through the baffling part, to precipitate and separate foreign substances, to cause clean water to rise through a plurality of divided inclined pipes, and to discharge the clean water to the outside.

In addition, it will be desirable that the stirring member enables the waste/turbid water to be stirred by using the flow of the waste/turbid water itself introduced into the water-supplying part.

Furthermore, it will be preferable that the multipurpose wheel-washing apparatus further includes a sludge-filtering unit, wherein the sludge-filtering unit includes a sack-type filtration member made by a weaving method and having a function of filtering out sludge; a water-supplying member configured to supply the waste/turbid water containing the sludge from the precipitation separation part or the inclined precipitation part to the sack-type filtration member; and a drainage member configured to collect clean water from which the sludge is filtered out while the waste/turbid water passes through the sack-type filtration member.

Advantageous Effects

According to the present invention described above, a blower fan used for spraying water is provided in a multipurpose wheel-washing apparatus to reduce scattering dust, the multipurpose wheel-washing apparatus has an improved vertically separable configuration so as to increase productivity, a lower frame of a wheel-washing unit of the multipurpose wheel-washing apparatus is narrower than a width of a loading deck of a transportation vehicle so as to increase movement convenience of the wheel-washing unit, and a function of purifying waste/turbid water generated upon washing of wheels can be greatly enhanced to enable purified water to be reused as wheel-washing water and to be safely discharged into a river, thereby significantly reducing environmental pollution.

DETAILED DESCRIPTION OF THE INVENTION

Figure 1:
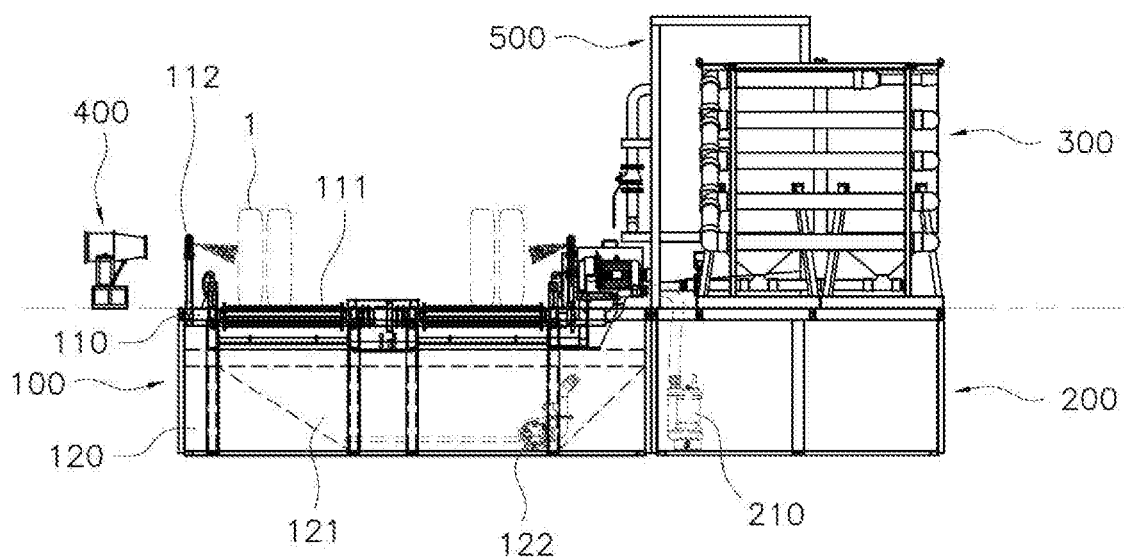
FIG. 1 is a front view illustrating a multipurpose wheel-washing apparatus according to the present invention.
Figure 2:
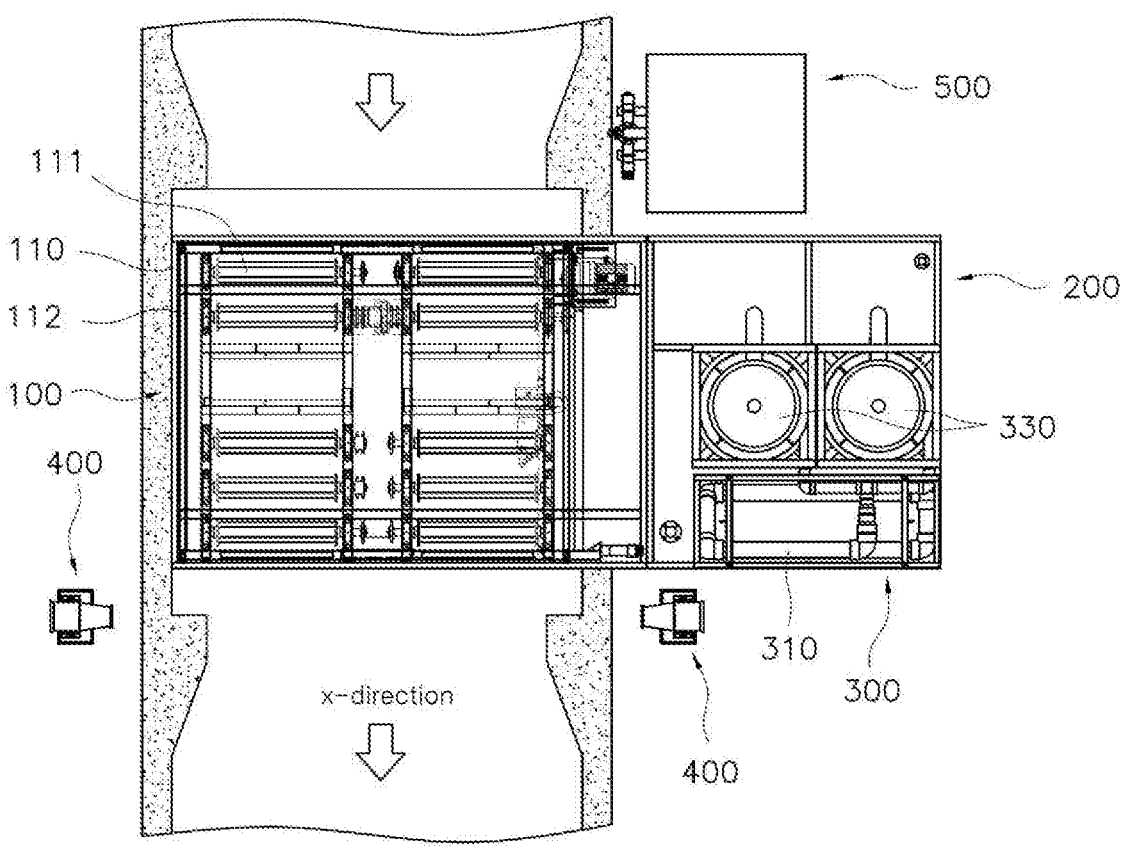
FIG. 2 is a plane view illustrating the multipurpose wheel-washing apparatus according to the present invention.
Figure 3:
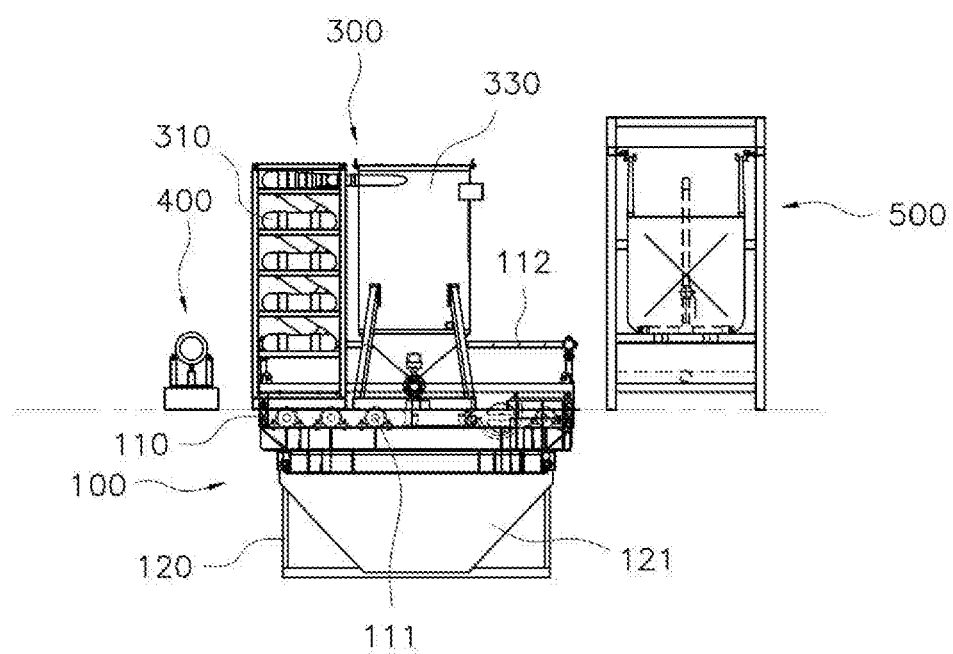
FIG. 3 is a right side view illustrating the multipurpose wheel-washing apparatus according to the present invention.

FIG. 1 is a front view illustrating a multipurpose wheel-washing apparatus according to the present invention, FIG. 2 is a plane view illustrating the multipurpose wheel-washing apparatus according to the present invention, and FIG. 3 is a right side view illustrating the multipurpose wheel-washing apparatus according to the present invention.

Figure 4:
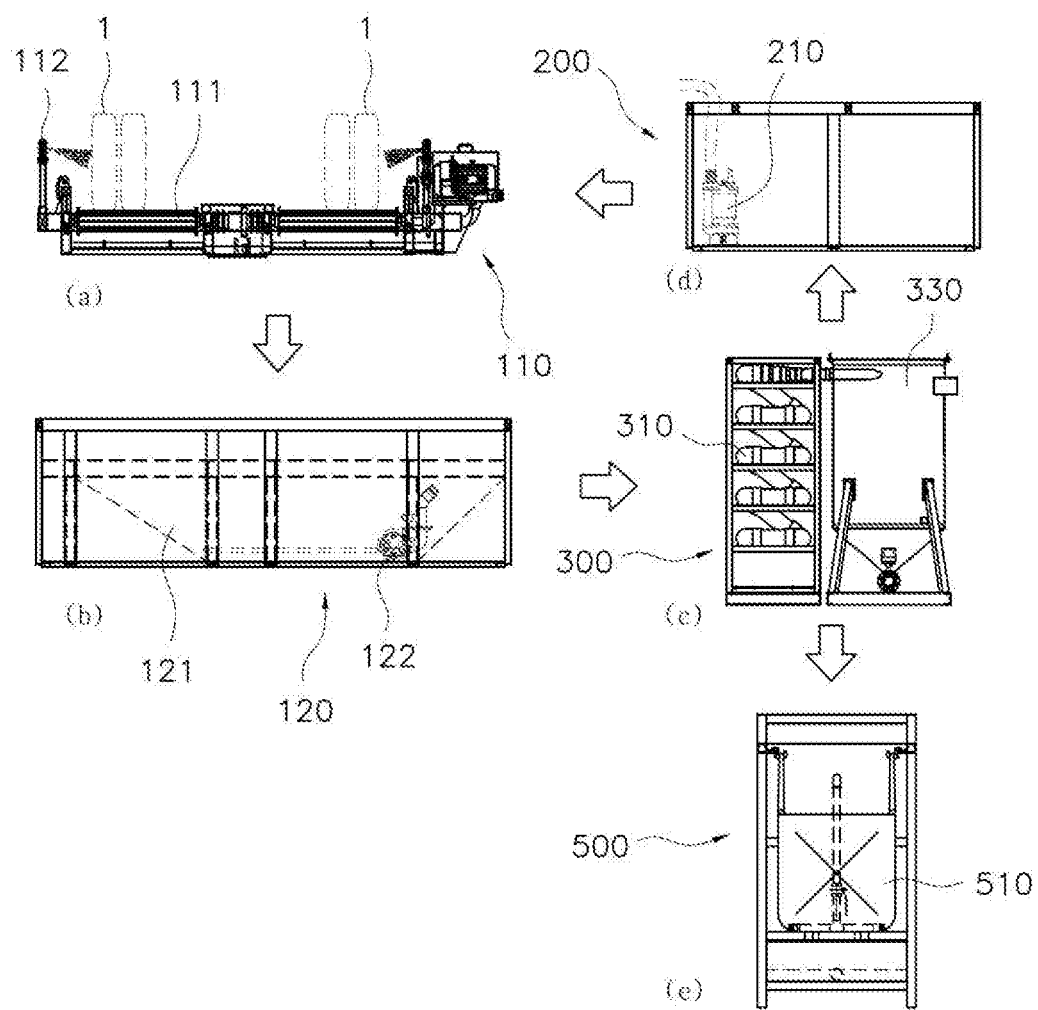
FIG. 4 is a view schematically illustrating a flow of water in the multipurpose wheel-washing apparatus according to the present invention.

Further, FIG. 4 is a view schematically illustrating a flow of water in the multipurpose wheel-washing apparatus according to the present invention, wherein (a) shows an upper frame 110 of a wheel-washing unit 100, (b) shows a lower frame 120 of the wheel-washing unit 100, (c) shows a purification unit 300, (d) shows a water storage unit 200, and (e) shows a sludge-filtering unit 500.

Figure 5:
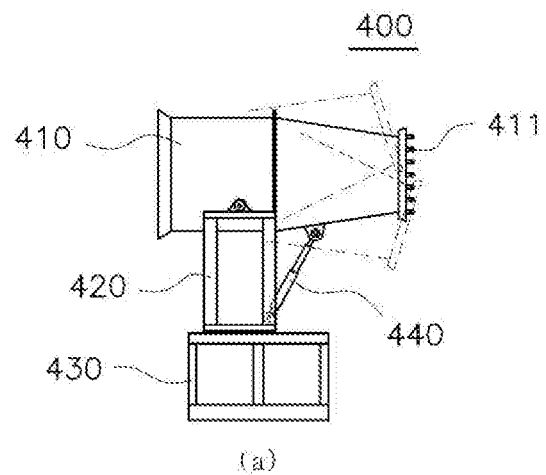
FIG. 5 is a view illustrating a blowing unit in the multipurpose wheel-washing apparatus according to the present invention.
Figure 5:
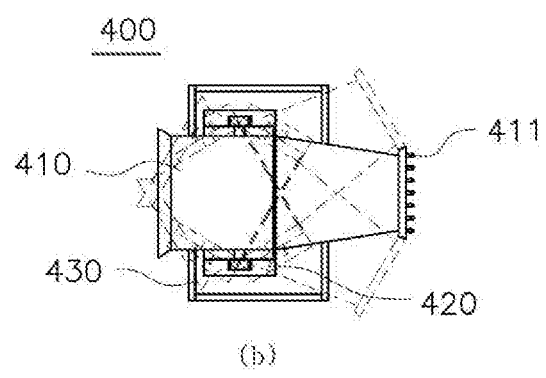
Figure 6:
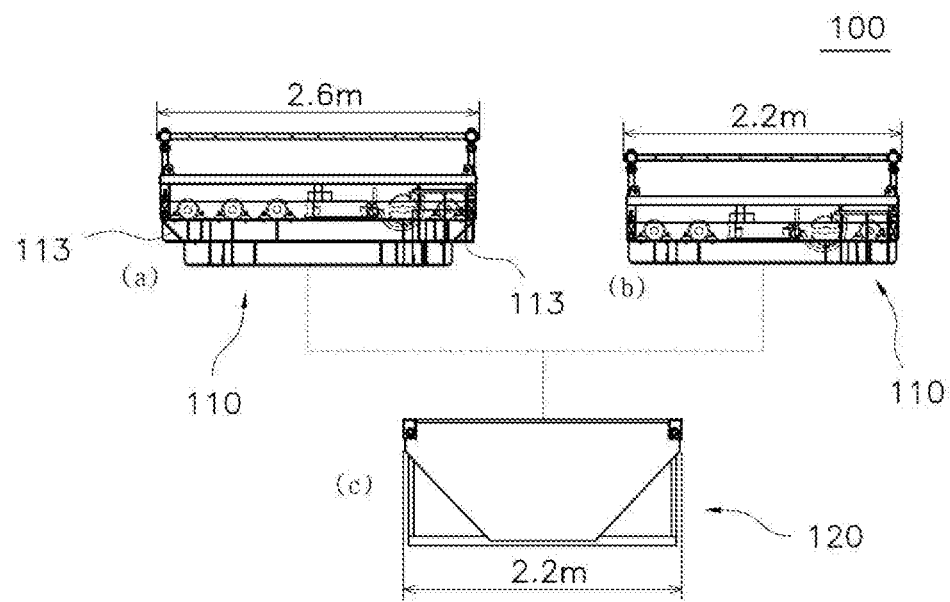
FIG. 6 is a right side view illustrating a wheel-washing unit in the multipurpose wheel-washing apparatus according to the present invention.

Moreover, FIG. 5 is a view illustrating a blowing unit in the multipurpose wheel-washing apparatus according to the present invention, wherein (a) is a front view and (b) is a plane view; and FIG. 6 is a right side view illustrating a wheel-washing unit in the multipurpose wheel-washing apparatus according to the present invention, wherein (a) shows a 10-roll type upper frame 110, (b) shows an 8-roll type upper frame 110, and (c) shows the lower frame 120.

Figure 7:
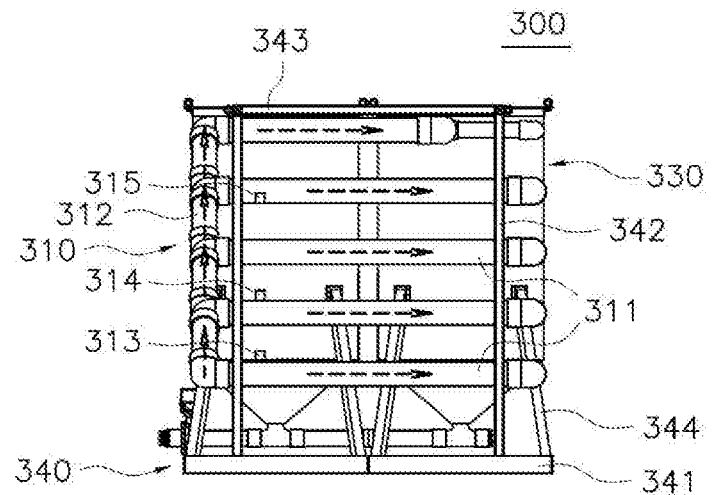
FIG. 7 is a view illustrating a centrifugation-type purification unit in the multipurpose wheel-washing apparatus according to the present invention.
Figure 7:
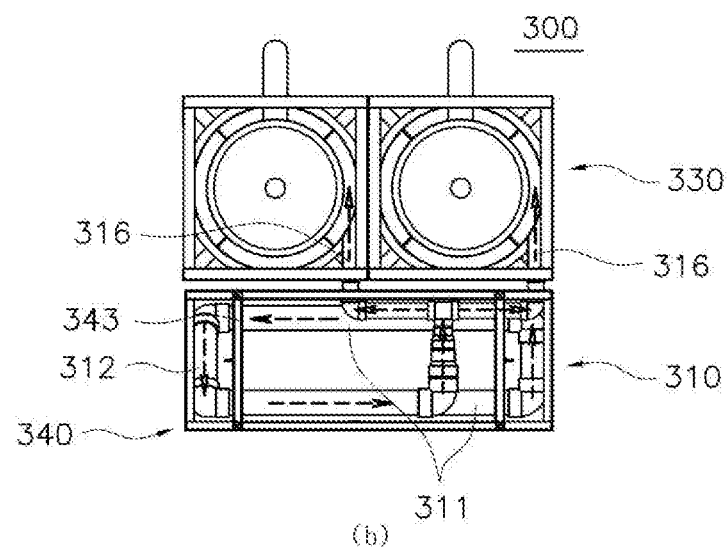
Figure 7:
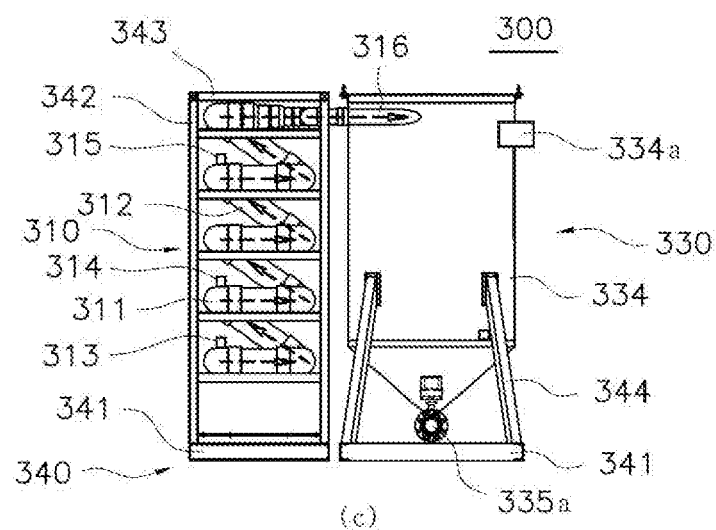
Figure 8:
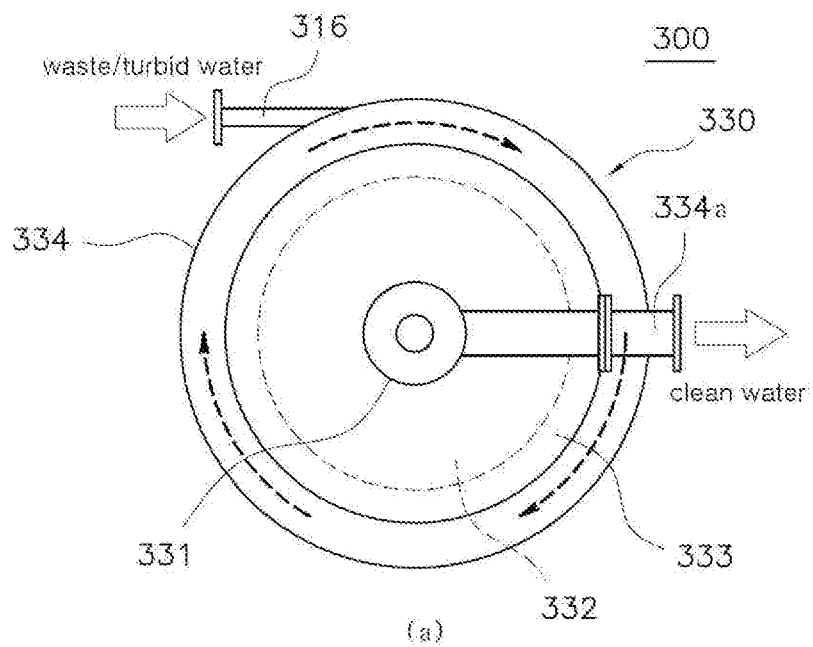
FIG. 8 is a view illustrating a flow of water for the centrifugation-type purification unit in the multipurpose wheel-washing apparatus according to the present invention.
Figure 8:
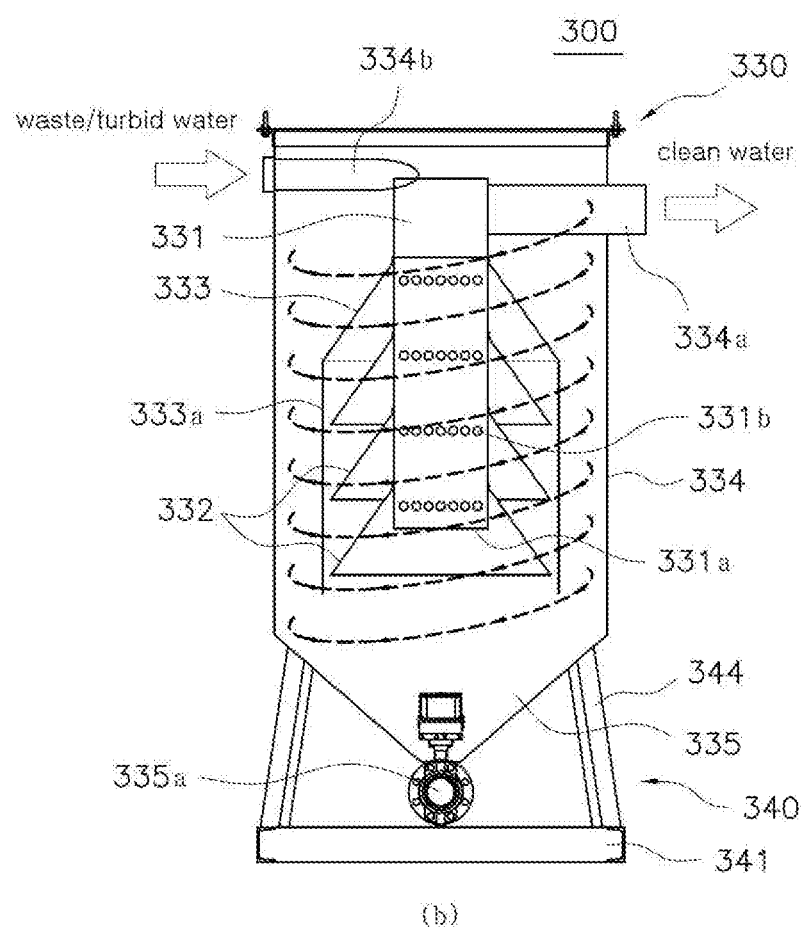

In addition, FIG. 7 is a view illustrating a centrifugation-type purification unit in the multipurpose wheel-washing apparatus according to the present invention, wherein (a) is a front view, (b) is a plane view, and (c) is a right side view; and FIG. 8 is a view illustrating a flow of water for the centrifugation-type purification unit in the multipurpose wheel-washing apparatus according to the present invention, wherein (a) is a plan view and (b) is a sectional view.

Figure 9:
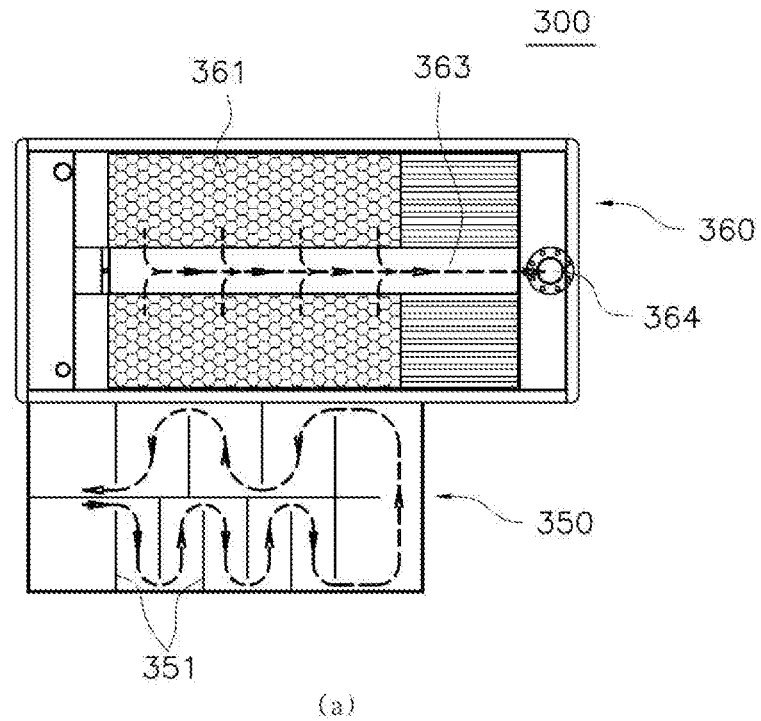
FIG. 9 is a view illustrating an inclined precipitation-type purification unit in the multipurpose wheel-washing apparatus according to the present invention.
Figure 9:
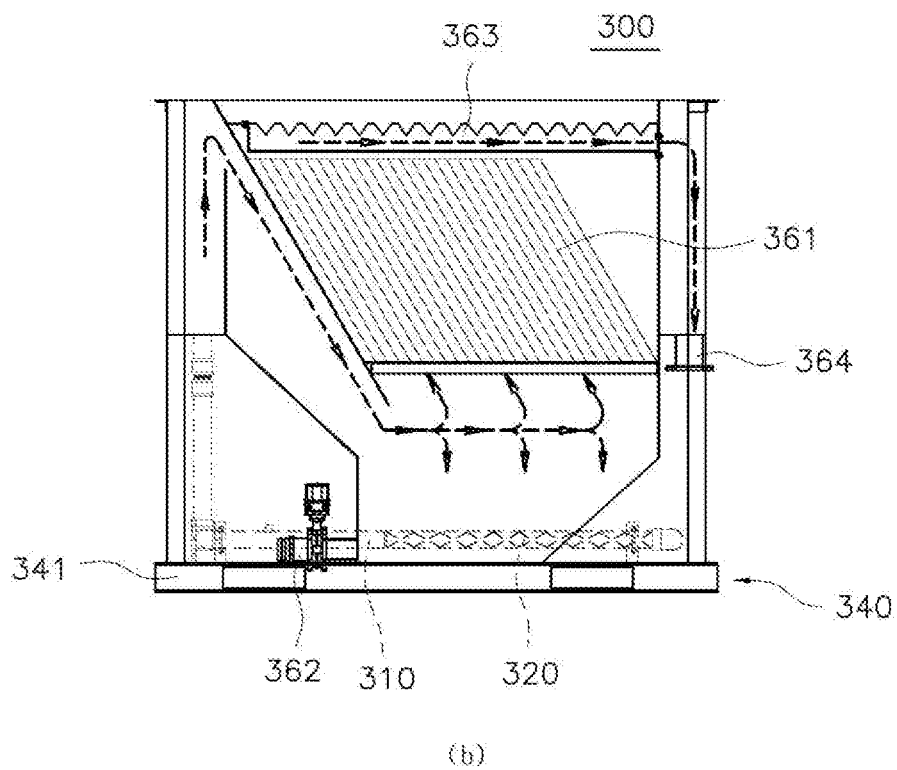
Figure 10:
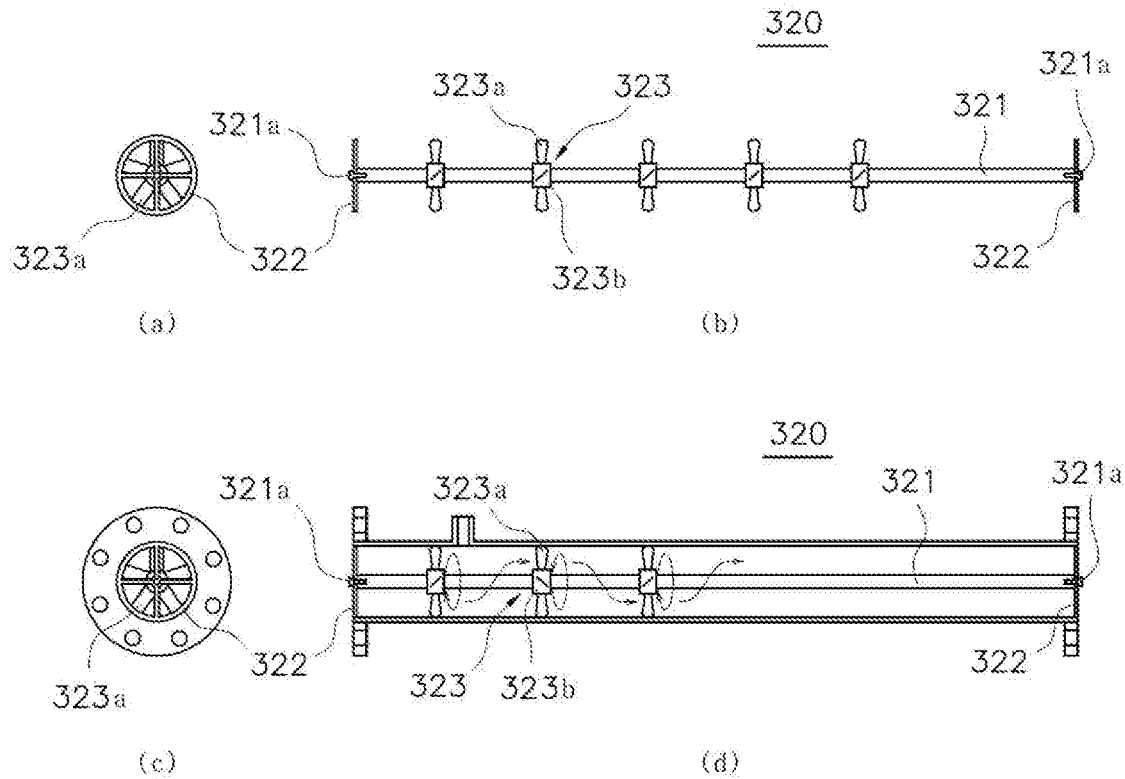
FIG. 10 is a view illustrating a rotary-type stirring member in the multipurpose wheel-washing apparatus according to the present invention.
Figure 11:
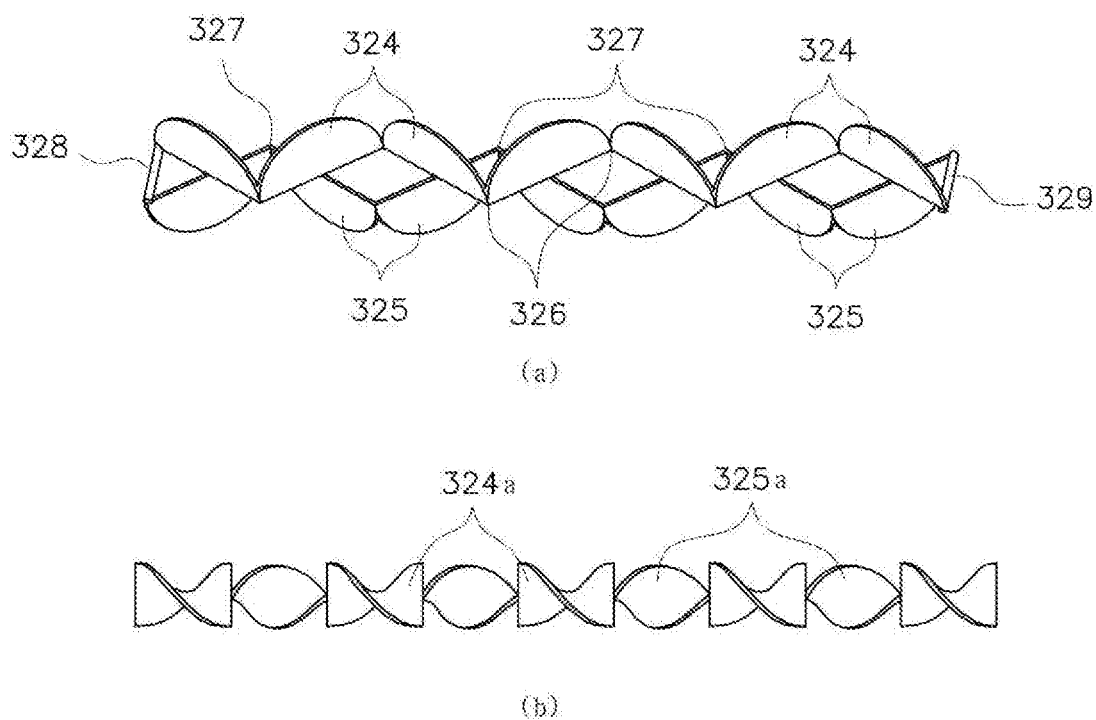
FIG. 11 is a view illustrating a fixed-type stirring member in the multipurpose wheel-washing apparatus according to the present invention.

Furthermore, FIG. 9 is a view illustrating an inclined precipitation-type purification unit in the multipurpose wheel-washing apparatus according to the present invention, (a) is a plan view and (b) is a front sectional view; FIG. 10 is a view illustrating a rotary-type stirring member in the multipurpose wheel-washing apparatus according to the present invention, wherein (a) and (b) are a left side view and a front view of a stirring member 320, respectively, and (c) and (d) are a left side view and a front view illustrating a state where the stirring member 320 is provided in a water-supplying part 310; and FIG. 11 is a view illustrating a fixed-type stirring member in the multipurpose wheel-washing apparatus according to the present invention, wherein (a) shows one example of the fixed-type stirring member and (b) shows another example of the fixed-type stirring member.

Figure 12:
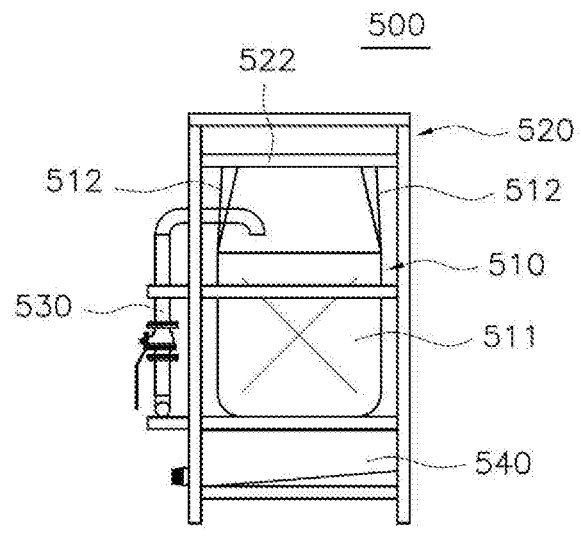
FIG. 12 is a view illustrating a hanger-type sludge-filtering unit in the multipurpose wheel-washing apparatus according to the present invention.
Figure 12:
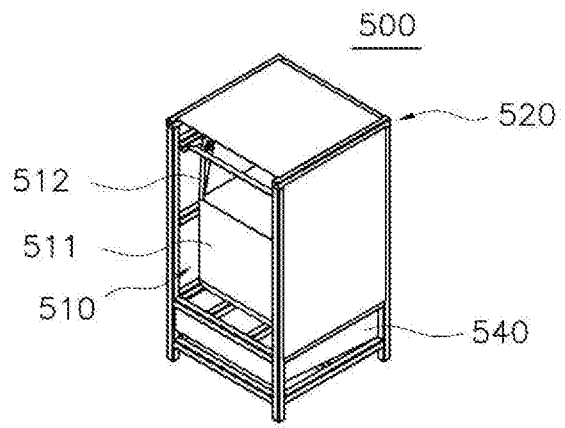
Figure 12:
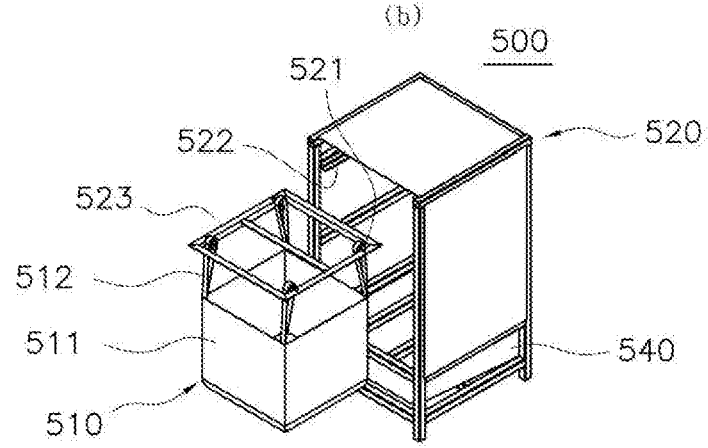
Figure 13:
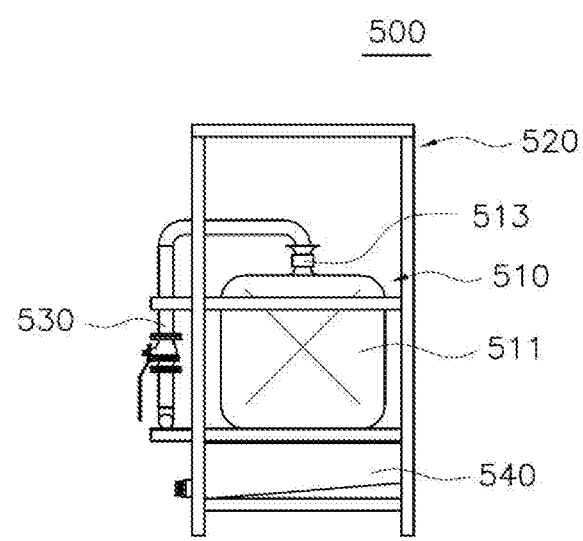
FIG. 13 is a view illustrating a laying out-type sludge-filtering unit in the multipurpose wheel-washing apparatus according to the present invention.

Finally, FIG. 12 is a view illustrating a hanger-type sludge-filtering unit in the multipurpose wheel-washing apparatus according to the present invention, (a) is a front view, (b) is a perspective view, and (c) is a perspective view illustrating an operating state; and FIG. 13 is a view illustrating a laying out-type sludge-filtering unit in the multipurpose wheel-washing apparatus according to the present invention.

The multipurpose wheel-washing apparatus according to the present invention is basically and technically characterized in that a blower fan used for spraying water is provided in the multipurpose wheel-washing apparatus to reduce scattering dust, the multipurpose wheel-washing apparatus has an improved vertically separable configuration so as to increase productivity, a lower frame of a wheel-washing unit of the multipurpose wheel-washing apparatus is narrower than a width of a loading deck of a transportation vehicle so as to increase movement convenience of the wheel-washing unit, and a function of purifying waste/turbid water generated upon washing of wheels can be greatly enhanced to enable purified water to be reused as wheel-washing water and to be safely discharged into a river, thereby significantly reducing environmental pollution.

Embodiments of the present invention will be described in detail below with reference to the accompanying drawings.

As illustrated in FIGS. 1 to 4, a multipurpose wheel-washing apparatus according to the present invention includes a wheel-washing unit 100 including an upper frame 110 provided with a plurality of rollers 111 on which wheels 1 of a vehicle are to be rotatably seated, and injection nozzles 112 configured to inject high-pressure washing water onto the wheels 1 seated on the rollers 111; and a lower frame 120 provided with a water tank 121 located below the upper frame 110 so as to collect falling waste/turbid water; a water storage unit 200 configured to store washing water to be supplied to the injection nozzles 112; a purification unit 300 configured to receive and purify the waste/turbid water from the water tank 121 and then send purified water to the water storage unit 200; and a blowing unit 400 disposed on an exit side of the wheel-washing unit 100 so as to blow air and provided with spray nozzles 411 for selectively spraying water in a particulate form.

That is, the multipurpose wheel-washing apparatus of the present invention largely includes the wheel-washing unit 100, the water storage unit 200, the purification unit 300, and the blowing unit 400 in order to significantly reduce environmental pollution.

First of all, the wheel-washing unit 100 has a configuration for substantially washing wheels of a vehicle and is preferably transported and installed by unitarily assembling the upper frame 110 and the lower frame 120 which have been separately manufactured.

The upper frame 110 may be placed such that an upper face of the upper frame is approximately flush with an installation face, and the lower frame 120 may be placed to be embedded in the installation face.

The upper frame 110 has a framework basically formed by a plurality of steel-skeleton structures, and is provided with the rollers 111 and the injection nozzles 112.

Hereinafter, for convenience of description, a fore-aft direction of a vehicle in which the vehicle passes through the upper frame 110 will be referred to as an x-direction as in FIG. 2, and a direction perpendicular to this heading direction will be referred to as a widthwise direction.

First, the rollers 111 are provided in pairs in the upper frame 110 so as to be spaced apart from each other in the widthwise direction, and these rollers 111 may be arranged in a plurality of rows such as 4 rows, 5 rows or the like in the x-direction.

If multiple pairs of rollers 111 are arranged in 4 rows, this configuration will be referred as an 8-roll type, and if multiple pairs of rollers 111 are arranged in 5 rows, this configuration will be referred as a 10-roll type, and FIG. 2 illustrates the 10-roll type upper frame 110.

Therefore, a widthwise length of the 8-roll type upper frame is the same as that of the 10-roll type upper frame, but the 10-roll type upper frame will be constructed such that an x-directional length thereof may be longer than that of the 8-roll type upper frame.

The respective rollers 111 are rotatably supported on the upper frame 110, so that the wheels 1 of the vehicle to be washed are allowed to be seated and rotated on the rollers 111.

Additionally, the plurality of injection nozzles 112 may be provided on both sides in the widthwise direction and disposed side by side on the upper frame 110 so that the injection nozzles 112 may inject high-pressure washing water toward the wheels 1 seated on the rollers 111 to wash the wheels 1.

As such, it is preferable that the washing water injected by the injection nozzles 112 of the upper frame 110 is supplied from the water storage unit 200 to be described below.

Further, in the wheel-washing unit 100, the lower frame 120 is configured such that it is located below the aforementioned upper frame 110 to collect waste/turbid water which was injected by the injection nozzles 112 and washed the wheels 1.

Such the lower frame 120 also has a framework formed by a plurality of steel-skeleton structures and is provided with the water tank 121.

The water tank 121 is generally made in the form of a container with an open upper side to enable waste/turbid water to be temporarily stored therein, and the water tank 121 may be provided to have a generally V shape as shown in FIG. 3 when viewed from a side.

Accordingly, all of waste/turbid water that was used to wash the wheels 1 in the upper frame 110 will fall into and then be recovered in the water tank 121 of the lower frame 120.

Additionally, a scraper or the like for collecting sludge contained in the waste/turbid water and for discharging the collected sludge to the outside of the water tank 121 may be further provided within the water tank 121, and this scraper is to physically discharge the sludge, which has been sunk in the water tank 121, to the outside of the water tank 121.

However, in the present invention, a pump 122 for discharging the waste/turbid water containing the sludge is provided within the water tank 121, and this pump 122 forcibly discharges the waste/turbid water in the water tank 121 to the purification unit 300 to be described later.

Next, the water storage unit 200 is configured to store washing water to be supplied to the injection nozzles 112 in the upper frame 110 of the aforementioned wheel-washing unit 100, may be provided on one side in the widthwise direction of the wheel-washing unit 100, and may be embedded in the installation face like the lower frame 120.

It will be possible to provide a pump 210 within the water storage unit 200 so as to supply the washing water stored in the water storage unit 200 to the injection nozzles 112.

Moreover, the purification unit 300 serves to receive waste/turbid water from the water tank 121 in the lower frame 120 of the wheel-washing unit 100, to purify the waste/turbid water, and to send purified clean water to the aforementioned water storage unit 200.

This purification unit 300 can essentially purify a large amount of waste/turbid water within a short time and may be preferably installed in a relatively small space. To this end, the purification unit 300 may be manufactured in various forms.

In the present invention, the preferred purification unit 300 is a centrifugation-type or an inclined precipitation-type, and detailed description thereof will be made later.

Finally, the blowing units 400 are placed in pairs to face each other on an exit side of the wheel-washing unit 100 to blow air and are provided with the spray nozzles 411 for selectively spraying water in a particulate form.

The blowing units 400 blow only air without spraying water upon washing of the wheels 1, so that the blowing units 400 may be utilized to dry the wheels 1 of the vehicle which leaves the wheel-washing-part 100 after it has been subjected to wheel washing in the wheel-washing unit 100.

In addition, when wheel washing is not performed, the blowing units 400 can spray water in a particulate form while blowing air in a state where they face in directions opposite to the wheel-washing unit 100, thereby performing a function of reducing scattering dust.

Moreover, considering a flow of water in the multipurpose wheel-washing apparatus of the present invention configured as described above, as illustrated in FIG. 4, the washing water injected by the injection nozzles 112 in the upper frame 110 of the wheel-washing unit 100 is collected in the water tank 121 of the lower frame 120.

Thereafter, the waste/turbid water is sent to the purification unit 300 by the pump 122 provided in the water tank 121 of the lower frame 120, the waste/turbid water is purified in the purification unit 300, and resulting purified clean water is then sent to the water storage unit 200.

The purified clean water collected in the water storage unit 200 may be supplied as washing water back to the injection nozzles 112 of the upper frame 110 by the pump 210.

In addition, in the purification unit 300, waste/turbid water having a large amount of sludge may be sent to the sludge-filtering unit 500 (FIG. 4 (e)) to be described below.

With this configuration, the multipurpose wheel-washing apparatus of the present invention basically purifies the waste/turbid water generated during the wheel washing so as to reuse the purified water as washing water, and provides the blowing units 400 to dry the wheels 1, which have been subjected to the wheel washing, and simultaneously to spray and blow water in a particulate form around the wheel-washing apparatus at normal times, thereby enabling significant reduction of scattering dust.

Hereinafter, addition of various functions to the aforementioned basic configuration of the present invention will be described.

First, in the present invention, as illustrated in FIG. 5, the blowing unit 400 preferably includes an blower fan 410 that houses rotatable blades driven by a motor and has the spray nozzles 411 provided on a discharge port side of the blower fan 410; a support arm 420 for vertically pivotably supporting the blower fan 410; a swing member 430 configured to rotate the support arm 420 so as to control a lateral swing angle of the blower fan 410; and a stretchable member 440 having both ends connected to the blower fan 410 and the support arm 420 so as to control a vertical pivoting angle of the blower fan 410 with respect to the support arm 420 depending on extension and contraction of the stretchable member 440.

That is, the blowing unit 400 may include the blower fan 410, the support arm 420, the swing member 430, and the stretchable member 440.

The blower fan 410 is formed in a generally cylindrical shape, and has the rotatable blades (not shown) housed in the blower fan 410 and driven by a drive motor (not shown), so that as electric power is supplied to the drive motor, the rotatable blades are rotated to blow air through the discharge port.

In addition, the plurality of spray nozzles 411 are provided along a circumferential edge on the discharge port side of the blower fan 410, so that the spray nozzles 411 may selectively spray water in a particulate from depending on whether water is supplied or not.

The support arm 420 is constructed to be connected to the middle of the blower fan 410 and to vertically pivotably support the blower fan 410, and may be made as Y-shaped arm or as a block-shaped arm as illustrated in the figures.

Moreover, the swing member 430 is located below the support arm 420 so as to support the support arm 420, and has a step motor (not shown) housed in the swing member 430 to rotate the support arm 420, thereby controlling the lateral swing angle of the blower fan 410.

Accordingly, the blower fan 410 can blow air while adjusting the lateral swing angle as shown in (b) of FIG. 5.

Furthermore, the stretchable member 440 is installed such that the both ends thereof are connected to the blower fan 410 and the support arm 420, and controls the vertical pivoting angle of the blower fan 410 with respect to the support arm 420 depending on extension and contraction of the stretchable member 440 in a longitudinal direction.

This stretchable member 440 may be constructed of a hydraulic or pneumatic cylinder, and as shown in (a) of FIG. 5, when the stretchable member 440 is extended, the blower fan 410 will be directed upward, and when the stretchable member 440 is contracted, the blower fan 410 will be directed downward.

A controller for controlling a facing direction and a blowing rate of the blower fan 410 and whether water is to be sprayed or not may be connected to the blowing unit 400. In particular, the controller may be connected to each of the spray nozzles 411, the swing member 430, and the stretchable member 440 to control the swing angle and an inclination angle of the blower fan 410 as well as whether water is to be sprayed, in response to electrical signals.

Therefore, it would be desirable that the controller can control the blower fan such that the blower fan 410 faces one of the wheels 1 and blows air toward the wheel 1 without spraying water to dry the wheel 1 which has been subjected to the wheel washing, but when the wheel washing is not performed, the blower fan 410 generally faces upward in a direction opposite to the wheel-washing unit 100 and blows air while spraying water to reduce scattering dust around the wheel-washing apparatus.

Further, a dust sensor may be added around the blowing unit 400 to detect a concentration of scattering dust, so that if the concentration of scattering dust exceeds a predetermined threshold, the blowing unit 400 may spray water while blowing air.

In addition, a communication part connectable to wired or wireless network may be connected to the aforementioned controller, so that an administrator may access the wired or wireless network to remotely control the blowing unit 400.

As a result, the blowing unit 400 can effectively reduce the scattering dust generated around the multipurpose wheel-washing apparatus of the present invention.

Next, the upper frame 110 and the lower frame 120 constituting the wheel-washing unit 100 will be described in greater detail.

As described above, the upper frame 110 of the wheel-washing unit 100 of the present invention may be manufactured, for example, as the 10-roll type as illustrated in (a) of FIG. 6, the 8-roll type as illustrated in (b) of FIG. 6, or the like.

It will be apparent that in addition to these configurations, various upper frames 110 having different x-directional lengths may be manufactured.

However, the lower frame 120 may be manufactured to be compatible with both the 8-roll type and 10-roll type upper frames 110, as well as all of various upper frames 110 having different x-directional lengths.

Accordingly, for example, since the lower frame 120 may be used compatibly in common, the inventory of the lower frame 120 may be secured by producing stocks of the lower frame 120 in advance prior to orders of consumers, the upper frame 110 may be separately manufactured to have a required x-directional length according to an order of a consumer, and the upper frame 110 and lower frame 120 may be then simply assembled with each other and delivered to the consumer.

In particular, in the present invention, the x-directional length of the lower frame 120 is preferably 2.2 m or less. This is due to the fact that a 5-ton truck is often used for transporting a wheel-washing machine after manufacture of the wheel-washing machine and a loading deck of the 5-ton truck is usually manufactured to have a width, i.e., an x-directional length, of 2.2 m.

If the x-directional length of the lower frame 120 exceeds 2.2 m, there is a limitation on loading of the lower frame on the loading deck of the 5-ton truck and thus transportation of the lower frame 120 should be carried out in a state where a door of the loading deck is opened, resulting in compromised safety.

For example, the 8-roll type upper frame 110 has the x-directional length of less than 2.2 m, but the 10-roll type upper frame 110 has the x-directional length greater than 2.2 m and up to about 2.69 m, which leads to difficulty in transporting the upper frame.

However, according to the present invention, even though the x-directional length of the lower frame 120 is 2.2 m but the upper frame 110 exceeds, for example, 2.2 m, the wheel-washing unit can be loaded and safely transported on the loading deck of the 5-ton truck, due to the x-directional length of the lower frame 120 of 2.2 m or less.

To enable such a configuration, in the present invention, assuming the fore-aft direction of a vehicle leaving the wheel-washing unit 100 is referred to as the x-direction of the vehicle, it is preferable that the x-directional length of the lower frame 120 is 2.2 m or less, the x-directional length of the upper frame 110 is longer than that of the lower frame 120, and the upper frame 110 is further provided with an inclined plate 113 having an x-directional length corresponding to a difference between the x-directional lengths of the upper frame 110 and the lower frame 120.

In other words, as illustrated in (a) of FIG. 6, the separate inclined plate 113 corresponding to the difference in the x-directional lengths is provided at lower portions of both sides of the upper frame 110 having the x-directional length greater than 2.2 m, so that even though the x-directional length of the upper frame 110 is longer, all of waste/turbid water resulting from completion of the wheel washing is guided into the water tank 121 of the lower frame 120.

Additionally, it will be preferable to further form a projection having an x-directional length of about 2.2 m on the bottom of the upper frame 110 having the x-directional length greater than 2.2 m, thereby preventing the upper frame 110 seated on the lower frame 120 from being moved in the x direction.

As a result, even though the x-directional length of the upper frame 110 exceeds the x-directional length of the lower frame 120, it is possible to easily transport the wheel-washing unit of the present invention in a state where the upper frame 110 is assembled to the lower frame 120.

In addition, it is possible to manufacture the lower frame 120 in advance and to manufacture and deliver only the upper frame 110 having a required x-directional length according to an order request, thereby increasing productivity and enhancing movement convenience.

Next, a detailed configuration of the aforementioned purification unit 300 will be described below.

As described above, the purification unit 300 should be able to effectively purify a large amount of waste/turbid water in a short time while occupying a relatively small space.

To this end, in the present invention, it will be preferable to employ any one of two types of the purification units 300, i.e., a centrifugation-type purification unit and an inclined precipitation-type purification unit.

First, as illustrated in FIGS. 7 and 8, it is preferable that the centrifugation-type purification unit 300 includes the water-supplying part 310 formed with a stirring space configured to enable flow of the waste/turbid water therein; the stirring member 320 provided in the stirring space so as to stir the waste/turbid water; and a precipitation separation part 330 configured to receive and swirl the waste/turbid water stirred in the water-supplying part 310, thereby precipitating and separating foreign substances and discharging clean water to the outside.

The centrifugation-type purification unit 300 may include the water-supplying part 310, the stirring member 320, and the precipitation separation part 330.

First, the stirring space is formed within the water-supplying part 310, wherein the stirring space is formed as a space in which the waste/turbid water flows in one direction. The water-supplying part 310 is configured to stir the waste/turbid water flowing into the water-supplying part and to provide the stirred waste/turbid water to the precipitation separation part 330 to be described later.

The water-supplying part 310 may include first pipes 311 and second pipes 312.

The plurality of first pipes 311 may be arranged horizontally in parallel to one another with differences in height therebetween, and the stirring member 320 is installed within at least one of the plurality of first pipes, preferably the lowermost first pipe 311, so as to stir the waste/turbid water in the first pipe 311.

Although the stirring member 320 may be installed only in the lowermost first pipe 311 of the plurality of first pipes 311, it is not necessarily limited thereto. The stirring member 320 may be installed in all or only some of the first pipes 311.

The first pipes 311 have openings to enable the waste/turbid water to flow from the water tank 121 provided on the lower frame 120 of the wheel-washing unit 100 into the lowermost first pipe 311.

Inflow of the waste/turbid water from the outside may be performed by the pump 122 provided in the water tank 121, whereby a stirring action of the stirring member 320 is performed within the first pipe 311. Here, the stirring action means that stirring is induced by generating turbulence in accordance with the flow of the waste/turbid water.

Moreover, as illustrated in (a) and (c) of FIG. 7, at least one of an neutralizing agent-inflow conduit 313, a flocculating agent-inflow conduit 314 and a polymer flocculating agent-inflow conduit 315 may be installed in the first pipe 311.

The neutralizing agent-inflow conduit 313, the flocculating agent-inflow conduit 314 and the polymer flocculating agent-inflow conduit 315 allow a neutralizing agent, a flocculating agent, and a polymer flocculating agent to flow into the respective first pipes 311.

As one example, the neutralizing agent may be one of caustic soda, soda carbonate, slaked lime and limestone, the flocculating agent may be one of aluminum sulfate and ferric chloride, and the polymer flocculating agent may be a polymer.

The waste/turbid water is flocculated with the neutralizing agent or flocculating agent within the first pipe 311 to form floccule, and the first pipe 311 functions as a reactor.

The second pipes 312 are fixedly installed between respective ones of the plurality of first pipes 311 and are in communication with the first pipes 311. The plurality of first pipes 311 are horizontally arranged with differences in height, whereas the plurality of second pipes 312 may be arranged at certain angles with differences in height.

Accordingly, the first pipes 311 and the second pipes 312 form a piping structure that is generally meanderingly arranged to have a relatively longer length in a limited space. The figures illustrate that the first pipes 311 and the second pipes 312 are arranged to sequentially rise in a generally spiral shape along a rectangular flow path.

Moreover, the first and second pipes 311 and 312 are in communication with each other to function as the water-supplying part 310 capable of supplying the flocculated waste/turbid water to the precipitation separation part 330.

The stirring member 320 is installed in the stirring space of the water-supplying part 310 and configured to stir the waste/turbid water.

Such the stirring member 320 may be provided in various forms, and in particular, it will be preferable in the present invention that the stirring member 320 enables the waste/turbid water to be stirred by using the flow of the waste/turbid water itself introduced into the water-supplying part 310.

In particular, in the present invention, the stirring member 320 may include any one of the rotary-type stirring member 320, which is rotated by the flow of the waste/turbid water itself so as to stir the waste/turbid water, and the fixed-type stirring member 320, which is not rotated unlike the rotary-type stirring member 320 and forms a flow passage for the waste/turbid water so as to stir the waste/turbid water.

First of all, the rotary-type stirring member 320 is to stir the waste/turbid water by being rotated by the flow of the waste/turbid water itself and will be first described, and then the fixed-type stirring member 320 will be described.

The rotary-type stirring member 320 may include a support portion 321, coupling portions 322, and mixer portions 323, as illustrated in (a) to (d) of FIG. 10.

The support portion 321 is formed to extend in one direction and may be made to be installed within the water-supplying part 310. As one example, the support part 321 may be installed in the first pipe 311 of the water-supplying part 310.

The support portion 321 is formed in a rod shape having a predetermined diameter so that the mixer portion 323 to be described later may be rotated.

The coupling portions 322 are installed at both ends of the support portion 321 and enable the support portion 321 to be installed within the water-supplying part 310.

The coupling portions 322 may be detachably coupled to the support portion 321, and for example, the coupling portions 322 may be coupled to the support portion 321 by bolts or unions.

FIG. 10 illustrates an example in which the coupling portions 322 are coupled to the support portion 321 by bolts 321*a*. Due to this configuration, it is easy to attach and detach the coupling portions and it is possible to easily perform maintenance of the stirring member 320, changes in structures of rotatable blades 323*a*, or the like.

Each of the mixer portions 323 has the plurality of rotatable blades 323*a* arranged radially, and the mixer portion 323 may further have a body 323*b* rotatably installed on the support portion 321. Each of the mixer portions 323 is rotated by the flow of the waste/turbid water to allow the rotatable blades 323*a* to stir the waste/turbid water.

On the other hand, a bearing may be installed inside the body 323*b*, thereby making it easier to rotate the mixer portion 323 relative to the support portion 321.

In each of the mixer portions 323, the plurality of rotatable blades 323*a* are inclined at a predetermined angle with respect to a flowing direction of the waste/turbid water (i.e., a direction from the left to the right in the figures; an extending direction of the support portion 321). Due to this configuration, each of the mixer portions 323 is configured to be easily rotated by the flow of the waste/turbid water.

In FIG. 10, (b) illustrates the mixer portions 323 each of which has five rotatable blades 323*a*. Although not explicitly illustrated in the figure, the five rotatable blades 323*a* in each of the mixer portions 323 may be inclined in the direction described above.

Moreover, the rotatable blades 323*a* in each of the mixer portions 323 are constructed to be at a constant inclination angle along an outer periphery of the body 323*b*, so that the plurality of rotatable blades 323*a* in each of the mixer portions 323 may be arranged side by side in a circumferential direction on the outer periphery of the body 232*b*.

With this inclined configuration of the rotatable blade 323*a*, it is also possible to expect that the rotatable blade 323*a* itself guides the flow of the waste/turbid water.

On the other hand, neighboring respective ones of the mixer portions 323 may have the plurality of rotatable blades 323*a* inclined in opposite directions, so that the plurality of neighboring mixer portions 323 may be rotated in directions opposite to each other.

Due to this configuration, the waste/turbid water is not stirred only in one direction but is stirred in both directions of forward and reverse directions. As one example, in (b) of FIG. 10, the leftmost mixer portion 323 is rotated in the forward direction about the support portion 321 as a rotation axis, the next mixer portion 323 (the second from the left) is rotated in the reverse direction, the next mixer portion 323 (the third from the left) is rotated in the forward direction, the next mixer portion 323 (the fourth from the left) is rotated in the reverse direction, and the mixer portion 323 (the rightmost one) may be rotated in the forward direction.

As a result, the waste/turbid water alternately forms forward streams and reverse streams while passing through the respective mixer portions 323, thereby further improving stirring performance.

The plurality of mixer portions 323 may be formed to be spaced apart from each other in the extending direction of the support portion 321. In FIG. 10, (b) illustrates an example of the rotary-type stirring member 320 including five mixer portions 323 arranged to be spaced apart from one another in the left-right direction, and (d) illustrates an example of the rotary-type stirring member 320 including three mixer portions 323 arranged to be spaced apart from one another in the left-right direction.

The number of the mixer portions 323 installed on the support portion 321 and the number of the rotatable blades 323a provided in the individual mixer portion 323 may be changed depending on a flow rate or flow speed. In particular, since the stirring member 320 of the present invention is configured to be easily detached from and attached to the pipe, it is possible to more easily change the number of the mixer portions 323 and the rotatable blades 323a.

With this configuration, the rotary-type stirring member 320 enables the waste/turbid water to be stirred by the flow of the waste/turbid water itself flowing into the water-supplying part 310.

In the present invention, the stirring member 320 provided in the centrifugation-type purification unit 300 may be a non-powered stirrer.

Next, as illustrated in FIG. 8, the precipitation separation part 330 receives and swirls the waste/turbid water, which has been reacted and flocculated in the first pipe 311, to precipitate and separate floc and to discharge clean water to the outside.

As one example, an inflow pipe 316 may be installed on the precipitation separation part 330, and the inflow pipe 316 is also in communication with the aforementioned water-supplying part 310 to enable the waste/turbid water, which has been reacted and flocculated in the first pipe 311, to flow into the precipitation separation part 330.

The waste/turbid water provided to the precipitation separation part 330 is flocculated within the first pipe 311 by the stirring member 320.

Moreover, as described above, the mixer portions 323 may be installed on the support portion 321 so as to be rotatable by the flow of the waste/turbid water (hydraulic power of raw water), thereby coarsening the floc.

As illustrated in (b) of FIG. 8, the precipitation separation part 330 may include a body portion 334 having a floc-removing portion 335 formed at the bottom of the body portion 334, wherein the precipitation separation part 330 is configured to remove the floc from the waste/turbid water and simultaneously to discharge clean water with the floc removed therefrom to the outside of the body portion 334 and subsequently to the aforementioned water storage unit 200.

In the present invention, the precipitation separation part 330 may be considered as a cyclone for precipitating and separating foreign substances from the waste/turbid water.

The body portion 334 may be constructed of, for example, a cylindrical tank. A high-speed nozzle 334b may be connected to an upper outer peripheral surface of the body portion 334, wherein the high-speed nozzle 334b is connected tangentially to the outer peripheral surface of the body portion 334, so that when the waste/turbid water enters the body portion 334 through the high-speed nozzle 334b, a swirling flow is generated within the body portion 334.

The floc-removing portion 335 in the shape of a funnel and having a diameter gradually decreasing toward a lower side thereof is formed at the bottom of the body portion 334, so that the floc precipitated by the swirling flow generated in the body portion 334 is collected in the floc-removing portion 335. Then, when a certain amount of floc is accumulated in the floc-removing portion 335, the accumulated floc is discharged to the outside through a floc-discharging portion 335a and may be sent to the sludge-filtering unit 500 to be described below.

Furthermore, since the floc-removing portion 335 defines a lower face of the precipitation separation part 330, the waste/turbid water introduced from the outside is accommodated in the floc-removing portion.

The precipitation separation part 330 may also include a drainage pipe portion 331 and precipitation guide portions 332.

The drainage pipe portion 331 may be a hollow pipe that is upright in a vertical direction, and the precipitation guide portions 332 and a guide skirt 333 are fixedly supported on an outer peripheral surface of the drainage pipe portion 331.

The outer peripheral surface of the drainage pipe portion 331 between the precipitation guide portions 332 is formed with flow through-holes 331b for allowing the waste/turbid water to flow into the drainage pipe portion 331.

A drainage communication pipe is connected to an upper opening of the drainage pipe portion 331, wherein the drainage communication pipe has a discharge port for discharging clean water resulting from separation of the floc from the waste/turbid water flowing into the drainage pipe portion 331 through the flow through-holes 331b. A precipitate outflow hole 331a is formed at the bottom of the drainage pipe portion 331, so that the precipitated floc is discharged downward through the precipitate outflow hole 331a and then accumulated in the aforementioned floc-removing portion 335.

The plurality of funnel-shaped precipitation guide portions 332 having diameters gradually increasing toward lower sides thereof are formed at regular intervals in a vertical direction on the outer peripheral surface of the drainage pipe portion 331.

The precipitation guide portions 332 guide precipitation of some of the floc, which cannot enter the drainage pipe portion 331 through the flow through-holes 331b, to be accumulated in the floc-removing portion 335. The precipitation guide portions 332 are also configured to be open at lower sides thereof, so that the waste/turbid water may rise upward between the precipitation guide portions 332 within the body portion 334.

The number of the precipitation guide portions 332 is not particularly limited, but about 2 to 10 precipitation guide portions 332 are preferred. FIG. 8 illustrates an example of three precipitation guide portions 332.

Moreover, the precipitation separation part 330 may further include the guide skirt 333 disposed above the precipitation guide portions 332.

The guide skirt 333 is comprised of an upper portion formed in the shape of a funnel that is parallel to the precipitation guide portions 332 and has a gradually increasing diameter, and a lower portion formed as a cylindrical skirt sidewall 333a.

The skirt sidewall 333a has a cylindrical structure extending by a predetermined length downward from a lower end of the guide skirt 333, whereby the guide skirt 333 including the skirt sidewall 333a surrounds the precipitation guide portions 332 located below the guide skirt 333.

Also, a lower end of the skirt sidewall 333a is opened to allow the waste/turbid water to rise upward.

The inventor of the present invention carried out experiments and numerical analysis while changing various dimensions of the centrifugation-type purification unit 300 of the present invention. As a result, it could be confirmed that when there was provided the guide skirt 333 including the skirt sidewall 333a surrounding the precipitation guide portion 332 as described above, a swirling flow which was most effective to remove the floc was generated within the body portion 334.

In addition, in the present invention, the precipitation guide portions 332 and the guide skirt 333 were at the same inclination angle, and the most preferable results were obtained at the inclination angle of 45 to 60 degrees with respect to a horizontal plane.

Moreover, based on a diameter D of the body portion 334, a gap between an inner peripheral surface of the body portion 334 and an outer peripheral surface of the skirt sidewall 333a of the guide skirt 333 was preferably 0.02D to 0.2D.

Furthermore, based on the diameter D of the body portion 334, a gap between an inner peripheral surface of the skirt sidewall 333a of the guide skirt 333 and lower outer peripheral surfaces of the precipitation guide portions 332 was preferably 0.02D to 0.2D.

The centrifugation-type purification unit 300 may further include a frame 340, and the water-supplying part 310 and the precipitation separation part 330 are installed on this frame 340.

As shown in FIG. 7, the frame 340 may include a base frame 341 forming the bottom of the frame 340, first and second support frames 342 and 343 for supporting the first and second pipes 311 and 312 of the water-supplying part 310, and a cyclone-supporting portion 344 for supporting the precipitation separation part 330.

The first support frame 342 extends vertically in an upward direction from the base frame 341, and the second support frame 343 may be arranged in a horizontal direction orthogonal to the first support frame 342. The first support frame 342 is formed to be capable of accommodating the first and second pipes 311 and 312.

The first and second pipes 311 and 312 may be supported by the first and second support frames 342 and 343 so that the first and second pipes 311 and 312 may maintain a multi-layered structure rising in a spiral shape.

Hereinafter, referring to FIG. 8, a fluid flow in which the waste/turbid water flows into the centrifugation-type purification unit 300 of the present invention and resulting clean water through separation of foreign substances such as floc from the waste/turbid water is discharged will be described.

FIG. 8 briefly illustrates an example in which the waste/turbid water flocculated in the water-supplying part 310 flows into the precipitation separation part 330 through the high-speed nozzle 334b and is converted into clean water which is then discharged.

In the centrifugation-type purification unit 300 having the aforementioned configuration, the waste/turbid water flows into the first pipe 311, wherein the inflow of the waste/turbid water may be made by the pump 122 provided on the lower frame 120 of the wheel-washing unit 100. Accordingly, a flow of the waste/turbid water is generated within the first pipe 311.

The mixer portions 323 of the rotary-type stirring member 320 are rotated by the flow of the waste/turbid water within the first pipe 311, so that the waste/turbid water is stirred without using separate power. In FIG. 10, (d) illustrates an example in which the waste/turbid water is moved while forming rotational flows in forward and reverse directions by means of the respective mixer portions 323.

For example, a polymer, which is a polymer flocculating agent, is added as an input chemical, so that soil and suspended substances contained in the water/turbid water react with the chemical and thus flocculation of the foreign substances is induced to coarsen particles of the foreign substances, thereby forming floc.

Thereafter, the waste/turbid water that has passed through the first pipes 311 and the second pipes 312 flows into the body portion 334 through the high-speed nozzle 334b of the body portion 334, wherein the waste/turbid water forms a swirling flow within the body portion 334.

Accordingly, the floc contained in the waste/turbid water will be precipitated onto a lower center of the body portion 334 and discharged to the outside of the body portion 334 through the floc-removing portion 335, and the discharged floc may be sent to the sludge-filtering unit 500 to be described later.

The waste/turbid water rotating as the swirling flow formed within the body portion 334 as such passes through a gap between the precipitation guide portions 332, which are formed at the precipitate outflow hole 331a, flows into the drainage pipe portion 331 via the flow through-holes 331b, and is then discharged to the outside of the body portion 334 through the discharge port 334a.

At this time, the swirling flow of the waste/turbid water is rapidly reduced on upper faces of the precipitation guide portions 332, the floc contained in the waste/turbid water rolls down along the upper faces of the precipitation guide portions 332 and are precipitated in the aforementioned floc-removing portion 335. Even within the drainage pipe portion 331, the floc is precipitated into the floc-removing portion 335 through the precipitate outflow hole 331a.

Both separation caused by a surface loading rate and dynamic separation caused by the swirling flow simultaneously occur in this swirling flow, so that grown floc falls down and a fluid gradually forms a laminar flow and rises toward the drainage pipe portion 331, thereby further improving the precipitation effect on the floc from the waste/turbid water.

Therefore, the centrifugation-type purification unit 300 of the present invention has excellent advantages that by adding the guide skirt 333 including the guide skirt sidewall 333a surrounding the precipitation guide portions 332, an optimum swirling flow for precipitating the floc from the waste/turbid water can be generated, thereby maximizing filtration efficiency for the waste/turbid water.

Next, the fixed-type stirring member 320 which is not rotated by the flow of the waste/turbid water itself and forms a flow passage for the waste/turbid water so as to stir the waste/turbid water will be described.

This fixed-type stirring member 320 is different from the aforementioned rotary-type stirring member 320 in that it is not rotated by the flow of the waste/turbid water itself.

The fixed-type stirring member 320 will be described with reference to FIG. 11. One example of the fixed-type stirring member 320 is illustrated in (a) of FIG. 11.

This fixed-type stirring member 320 may include a first member 324 and a second member 325.

There may be provided a plurality of first members 324 and the first members 324 may have connection ends 326 that are connected to each other to define a predetermined angle.

There may be provided a plurality of second members 325, and the second members 325 are arranged to intersect the first members 324 and may have connection ends 327 that are connected to each other to define a predetermined angle.

As illustrated in (a) of FIG. 11, the first and second members 324 and 325 may be arranged to maintain a phase difference by ¼ cycle with respect to each other, and each of the first and second members 324 and 325 may have a semi-circular cross section.

The first and second members 324 and 325 may be coupled with each other at one point between the connection ends 326 at which neighboring ones of the plurality of first members 324 are connected to each other and at one point between the connection ends 327 at which neighboring ones of the plurality of second members 325 are connected to each other.

With this configuration, the first and second members 324 and 325 cooperatively form an X shape.

Connection among the plurality of first members 324 and connections among the plurality of second members 325 may be made by welding, respectively, and coupling between the first member 324 and the second member 325 may also be made by welding, but they are not necessarily limited thereto.

Flow passages are defined along respective faces of the plurality of first and second members 324 and 325, wherein the waste/turbid water passes through the flow passages formed by the first and second members 324 and 325 and is mixed with a neutralizing agent or flocculating agent and also stirred.

The first and second members 324 and 325 are arranged to intersect each other and are in the shape of a semi-circle, so that the flow path of the waste/turbid water is alternately turned to stir the waste/turbid water. Accordingly, the waste/turbid water forms streams while passing through the respective first and second members 324 and 325 to further enhance stirring performance.

In particular, as the waste/turbid water that is to pass through the first and second members 324 and 325 passes through the first and second members 324 and 325, the waste/turbid water bisectionally branches off into the respective flow passages of the first and second members 324 and 325. Assuming that the number of branches is S and the number of the first and second members 324 and 325 is n, the number of the branches may be $S=2^n$.

The fixed-type stirring member 320 may further include a first coupling end 328 and a second coupling end 329. Here, the first coupling end 328 and the second coupling end 329 may extend between respective ends of the outermost opposite first and second members 324 and 325 such that the first and second coupling ends 328 and 329 are arranged to connect the respective ends of the outermost opposite first and second members 324 and 325 to each other.

The first and second coupling ends 328 and 329 are installed within the water-supplying part 310, and by way of example, may be installed on an inner periphery of the first pipe 311 of the water-supplying part 310.

The plurality of first and second members 324 and 325 may be provided between the first and second coupling ends 328 and 329.

The number of the first and second members 324 and 325 or angles defined by the first and second members 324 and 325 may be changed depending on a flow rate or flow speed.

Further, another example of the fixed-type stirring member 320 is illustrated in (b) of FIG. 11.

This fixed-type stirring member 320 may include first and second members 324a and 325a, and each of the first member 324a and the second member 325a is manufactured by twisting a generally rectangular plate through about 180 degrees into the shape of a twisted bread stick such that the twisted plate is plastically deformed.

However, twisted directions of the first member 324a and the second member 325a are opposite to each other.

Moreover, the first members 324a and the second members 325a are alternately positioned, and connection portions of the first and second members 324a and 325a are fixed by welding or the like in a state where the first and second members 324a and 325a are generally perpendicular to each other.

Again, it will be apparent that the coupling between the first member 324a and the second member 325a is not limited to use of the welding.

As a result, if clockwise rotation of the waste/turbid water, for example, is generated when the waste/turbid water passes through the first members 324a in the water-supplying part 310, counterclockwise rotation of the waste/turbid water is generated when the waste/turbid water passes through the second members 325a, whereby it is possible to perform the same effect as that in one example of the aforementioned fixed-type stirring member 320.

In the present invention, this fixed-type stirring member 320 has no noise, vibration, or leakage during operation, requires less maintenance/repair due to less occurrence of failures than a powered stirrer, and can also be made of various materials.

On the other hand, although the mixing and stirring of the waste/turbid water have been mainly described herein, it is possible to mix and stir various fluids such as other liquids, gases, or mixed fluids of liquids and gases.

Furthermore, the fixed-type stirring member 320 has a simple structure in the present invention and enables the mixing and stirring of the waste/turbid water, thereby shortening a manufacturing process, facilitating a process management, and reducing production costs.

In addition, since separate power or energy is not required to mix and stir the waste/turbid water, an energy saving effect may be expected.

In the present invention, the fixed-type stirring member 320 may be an in-line mixer.

Although the centrifugation-type purification unit 300 has been described hereinbefore, the inclined precipitation-type purification unit 300 will be described below.

In the present invention, as illustrated in FIG. 9, the inclined precipitation-type purification unit 300 preferably includes the water-supplying part 310 formed with a stirring space configured to enable flow of the waste/turbid water therein; the stirring member 320 provided in the stirring space so as to stir the waste/turbid water; a baffling part 350 configured to receive the waste/turbid water stirred in the water-supplying part 310 and to cause the waste/turbid water to flow in a zigzag shape; and an inclined precipitation part 360 configured to receive the waste/turbid water, which has passed through the baffling part 350, to precipitate and separate foreign substances, to cause clean water to rise through a plurality of divided inclined pipes 361, and to discharge the clean water to the outside.

In the multipurpose wheel-washing apparatus according to the present invention, the inclined precipitation-type purification unit 300 may largely include the water-supplying part 310, the stirring member 320, the baffling part 350, and the inclined precipitation part 360.

First, the water-supplying part 310 is the water-supplying part 310 already described in the aforementioned centrifugation-type purification unit 300, and the stirring member 320 is provided in the stirring space.

The stirring member 320 may be configured as any one of the rotary-type stirring member 320 and the fixed-type stirring member 320 described above.

This water-supplying part 310 receives the water/turbid water from the pump 122 provided on the lower frame 120 of the wheel-washing unit 100, and as illustrated in (b) of FIG. 9, the water-supplying part 310 is approximately provided on a lower side to transfer the waste/turbid water to the subsequent baffling part 350.

The baffling part 350 serves as a floc-forming reactor while stirring the water/turbid water in a zigzag shape as illustrated in (a) of FIG. 9.

At this time, a plurality of baffles 351 can be alternately formed on both sides in the baffling part 350 so as to generate the flow of the water/turbid water in a zigzag shape.

In particular, it will be possible to variously adjust intervals of the baffles 351 in the baffling part 350.

For example, in the baffling part 350 illustrated in (a) of FIG. 9, the waste/turbid water existing at a lower side of the figure flows from the left to the right, and the waste/turbid water existing at an upper side of the figure flows from the right to the left.

At this time, the waste/turbid water flowing from the left to the right passes between the baffles 351 with relatively small intervals, and the waste/turbid water flowing from the right to the left passes between the baffles 351 with relatively large intervals.

Accordingly, when the waste/turbid water passes between the baffles 351 with the relatively small intervals, a rapid stirring function may be performed, whereas when the waste/turbid water passes between the baffles 351 with the relatively large intervals, a slow stirring function may be performed.

As a result, it is possible to promote mixing of the waste/turbid water and the flocculating agent in the baffling part 350 and to secure a time for forming the floc.

After passing through the baffling part 350 as described above, the waste/turbid water is sent to the inclined precipitation part 360.

As illustrated in FIG. 9, the plurality of divided inclined pipes 361 are provided at the center of the inclined precipitation part 360, and a sludge-discharging portion 362 configured to collect sludge and discharge it to the outside is provided below the inclined pipes 361.

The sludge discharged to the sludge-discharging portion 362 may be sent to the sludge-filtering unit 500 to be described later.

In addition, a weir 363 formed with triangular notches is provided above the inclined pipes 361, a drainage port 364 for discharging the clean water is formed on one side of the weir 363, and the clean water discharged through the drainage port 364 may be sent to the water storage unit 200.

The inclined pipes 361 may be made of, for example, honeycombs having hexagonal cross sections, sludge will sink to the bottom in the inclined precipitation part 360, and the clean water may rise upward while riding in the inclined pipes 361 and move to the drainage port 364 via the weir 363.

According to this configuration, the inclined precipitation-type purification unit 300 has an advantage that by increasing an effective area using the inclined pipes 361, precipitation efficiency is enhanced.

The clean water purified in the centrifugation-type purification unit 300 or the inclined precipitation-type purification unit 300 described hereinbefore will be sent to the aforementioned water storage unit 200 to be used as wheel-washing water.

On the contrary, the sludge discharged from the floc-discharging portion 335*a* of the centrifugation-type purification unit 300 or the sludge-discharging portion 362 of the inclined precipitation-type purification unit 300 contains a large amount of moisture. Therefore, if the sludge is discharged as it is, there is a concern that this sludge has great influence on environmental pollution, so that there is a need to perform dehydration in the additional sludge-filtering unit 500.

In the present invention, the sludge-filtering unit 500 may include a sack-type filtration member 510 made by a weaving method and having a function of filtering out the sludge; a water-supplying member 530 configured to supply the waste/turbid water containing the sludge from the precipitation separation part 330 or the inclined precipitation part 360 to the sack-type filtration member 510; and a drainage member 540 configured to collect clean water from which the sludge is filtered out while the waste/turbid water passes through the sack-type filtration member 510.

That is, the sludge-filtering unit 500 may include the sack-type filtration member 510, the water-supplying member 530, and the drainage member 540.

The sludge-filtering unit 500 may be classified into two types: hanger-type and laying out-type sludge-filtering units, and the hanger-type sludge-filtering unit 500 will be first described with reference to FIG. 12.

The hanger-type sludge-filtering unit 500 includes a sack 511 and connection loops 512, wherein the sack 511 is made by weaving synthetic or natural fibers, preferably geotextile, or the like, and filters out the sludge through fine holes naturally formed in a woven fabric.

The geotextile refers to a water-permeable textile product for stabilizing soil, which is made of a synthetic polymeric material, and associated products thereof.

This sack 511 may be maded in the form of a polygonal or cylindrical column having an opening on an upper side, and the figures illustrates a square column-shaped sack 511.

This sack 511 is provided with one or more connection loops 512 extending upward, and the figures illustrates that the connection loops 512 are provided at four upper corners of the square column-shaped sack 511, respectively.

The length of each of the connection loops 512 determines an installation height of the sack 511 and may be appropriately increased or decreased, and the number of the connection loops 512 may be appropriately increased or decreased depending on the material or volume of the sack 511.

Further, a main frame 520 is constructed to define a basic framework of the sack-type filtration member 510 and to cause the sack-type filtration member 510 to be spaced upward apart from an installation surface and supported at a predetermined height. The main frame 520 is formed with hooks 521.

Each of the hooks 521 is formed in a generally "—" shape to enable the connection loops 512 of the sack-type filtration member 510 to be hung on the hook 521.

More preferably, each of the hooks 521 is L-shaped or c-shaped to prevent the connection loop 512 hung on the hook 521 from being disengaged by itself.

The hooks 521 may be formed directly on the main frame 520. Preferably, guides 522 are horizontally formed on the main frame 520, there are provided sliding frames 523 guided by the guides 522 so as to be slidably withdrawn or pushed in, and the hooks 521 may be then formed on the sliding frames 523.

Accordingly, when the sack-type filtration member 510 is replaced, it is possible to easily separate the sliding frames 523 with the sack-type filtration member 510 hung thereon from the main frame 520, and the sack-type filtration member 510 may also be easily replaced.

Next, the water-supplying member 530 is configured to supply the waste/turbid water containing the sludge to the sack-type filtration member 510.

To this end, an inlet of the water-supplying member 530 is installed to be in communication with the floc-discharging portion 335a of the centrifugation-type purification unit 300 or the sludge-discharging portion 362 of the inclined precipitation-type purification unit 300 described above, and an outlet of the water-supplying member 530 is supported on the main frame 520 and provided in the upper opening of the sack-type filtration member 510.

It will be apparent that the water-supplying member 530 should be provided on a side opposite to a side where the sliding frame 523 is received in the main frame 520, in order to prevent occurrence of interference with the sliding of the sliding frames 523.

Accordingly, it is possible to supply the waste/turbid water containing the sludge from the purification unit 300 into the sack-type filtration member 510.

Next, the drainage member 540 is configured to collect the clean water which has passed through and falls below the sack-type filtration member 510 as the sludge is filtered out by the sack-type filtration member 510 when the waste/turbid water supplied to the sack-type filtration member 510 passes through the sack-type filtration member 510 by its own weight.

To this end, the drainage member 540 is formed to have an area larger than that of the sack-type filtration member 510, and has a predetermined gradient to enable the clean water, which is being collected, to be gathered to one side.

The clean water collected in the drainage member 540 as such may be reused as washing water for washing the wheels or may be safely discharged into a river.

As described above, the hanger-type sludge-filtering unit 500 can efficiently remove the sludge from a large amount of waste/turbid water in a short time since the sludge is filtered out as the waste/turbid water containing the sludge passes through the sack-type filtration member 510 by its own weight.

Furthermore, the hanger-type sludge-filtering unit 500 according to the present invention has advantages that the function of filtering out the sludge is performed by own weight due to gravity without employing separate power, it is possible to realize a simplest configuration and minimize maintenance costs in consideration of various installation environments, and in particular, it is also possible to very easily perform replacement of the filtration member which is frequently and repeatedly required in response to accumulation of the sludge.

Next, unlike the aforementioned hanger-type sludge-filtering unit 500, the laying out-type sludge-filtering unit 500 is placed intactly on the main frame 520 as illustrated in FIG. 13.

Accordingly, only the sack 511 is included in the sack-type filtration member 510, the connection loops 512 are not required, and a separate sealing member 513 is required at an inlet of the sack 511.

The sealing member 513 ties the inlet of the sack 511 in a state where the pliable outlet of the water-supplying member 530 has been inserted into the sack 511, thereby maintaining airtightness and preventing the outlet of the water-supplying member 530 from being separated the sack 511.

As a result, the laying out-type sludge-filtering unit 500 can dehydrate a large amount of waste/turbid water in a short time since the sludge is filtered out by pressure at which the waste/turbid water containing the sludge flows into the sack-type filtration member 510, and purified water can be safely discharged into a river.

Hereinafter, the operation of the present invention will be described with reference to the figures.

First, in the present invention, scattering dust generated as the wheels are washed in the wheel-washing unit 100 will be significantly reduced by the blowing unit 400, and the waste/turbid water generated as the wheels are washed is collected in the water tank 121 of the lower frame 120 and is then sent to the centrifugation-type purification unit 300 or the inclined precipitation-type purification unit 300.

Accordingly, a chemical is input in the water-supplying part 310 and will be stirred with the waste/turbid water by the stirring member 320.

If the rotary-type stirring member 320 is employed, the stirring member 320 is rotated to stir the waste/turbid water and the chemical; whereas if the fixed-type stirring member 320 is employed, the waste/turbid water and the chemical will be efficiently stirred without rotation of the stirring member 320.

This waste/turbid water is purified in the purification unit 300, and purified clean water is sent to the water storage unit 200, whereas waste/turbid water containing a large amount of sludge is sent to the sludge-filtering unit 500 so as to be subjected to dehydration processing and then separated and discharged.

Then, the clean water sent to the water storage unit 200 will be reused as wheel-washing water.

The multipurpose wheel-washing apparatus of the present invention configured as above has great advantages that the blower fan 410 used for spraying water is provided in the multipurpose wheel-washing apparatus to reduce scattering dust, the multipurpose wheel-washing apparatus improves the wheel-washing unit 100 to have a vertically separable configuration so as to increase productivity, the lower frame 120 of the wheel-washing unit is narrower than a width of a loading deck of a transportation vehicle so as to increase movement convenience of the wheel-washing unit, and a function of purifying waste/turbid water generated upon washing of wheels can be greatly enhanced to enable purified water to be reused as wheel-washing water and to be safely discharged into a river, thereby significantly reducing environmental pollution.

The aforementioned embodiments are merely examples for specifically explaining the spirit of the present invention, and the scope of the present invention is not limited to the figures and embodiments.

What is claimed is:

1. A multipurpose wheel-washing apparatus comprising:
 a wheel-washing unit including:
  an upper frame provided with a plurality of rollers and injection nozzles,
   wherein wheels of a vehicle are to be rotatably seated on the plurality of rollers, and the injection nozzles are configured to inject pressurized washing water onto the wheels seated on the rollers; and
  a lower frame provided with a water tank located below the upper frame so as to collect falling waste water;
 a water storage unit configured to store washing water to be supplied to the injection nozzles;
 a purification unit configured to receive and purify the waste water from the water tank and then send purified water to the water storage unit; and
 a blowing unit disposed on an exit side of the wheel-washing unit so as to blow air and provided with a blower fan having spray nozzles for selectively spraying water in a particulate form,
wherein the purification unit is a centrifugation-type purification unit and comprises:
a water-supplying part including pipes configured to enable flow of the waste water therein;
a stirring member provided in at least one of the pipes so as to stir the waste water; and
a precipitation separation part configured to receive and swirl the waste water stirred in the water-supplying part, thereby precipitating and separating foreign substances and discharging clean water to the outside.

2. The multipurpose wheel-washing apparatus of claim 1, wherein the blowing unit comprises:
the blower fan having rotatable blades housed in the blower fan, the rotatable blades being driven by a motor, the blower fan being provided with the spray nozzles installed on a discharge port side of the blower fan;
a support arm for vertically pivotably supporting the blower fan;
a swing member having a step motor housed in the swing member and configured to rotate the support arm so as to control a lateral swing angle of the blower fan; and
a stretchable member having both ends connected to the blower fan and the support arm so as to control a vertical pivoting angle of the blower fan with respect to the support arm depending on extension and contraction of the stretchable member.

3. The multipurpose wheel-washing apparatus of claim 1, wherein:
an x-direction is a fore-aft direction of the wheel-washing unit by which the vehicle leaves,
an x-directional length of the lower frame is 2.2 m or less,
an x-directional length of the upper frame is longer than the x-directional length of the lower frame, and
the upper frame is further provided with an inclined plate having an x-directional length corresponding to a difference between the x-directional lengths of the upper frame and the lower frame.

4. The multipurpose wheel-washing apparatus of claim 1, wherein the stirring member enables the waste water to be stirred by using the flow of the waste water introduced into the water-supplying part.

5. The multipurpose wheel-washing apparatus of claim 1, further comprising a sludge-filtering unit, wherein the sludge-filtering unit comprises:
a sack-type filtration member made by weaving and having a function of filtering out sludge;
a water-supplying member configured to supply the waste water containing the sludge from the precipitation separation part to the sack-type filtration member; and
a drainage member configured to collect clean water from which the sludge is filtered out while the waste water passes through the sack-type filtration member.

\* \* \* \* \*